United States Patent
Boka et al.

(10) Patent No.: US 7,181,323 B1
(45) Date of Patent: Feb. 20, 2007

(54) COMPUTERIZED METHOD FOR GENERATING LOW-BIAS ESTIMATES OF POSITION OF A VEHICLE FROM SENSOR DATA

(75) Inventors: Jeffrey B. Boka, Lumberton, NJ (US); Peter J. Mavroudakis, Hightstown, NJ (US); Naresh R. Patel, Bellmawr, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 283 days.

(21) Appl. No.: 10/972,943

(22) Filed: Oct. 25, 2004

(51) Int. Cl.
  *G06F 17/10* (2006.01)
  *G06F 7/00* (2006.01)
(52) U.S. Cl. ............ 701/1; 701/101; 701/103; 73/1.16
(58) Field of Classification Search .......... 701/1, 701/29, 100–106, 110; 73/1–16, 861.05
  See application file for complete search history.

(56) References Cited

U.S. PATENT DOCUMENTS 5,960,097 A * 9/1999 Pfeiffer et al. ............ 382/103

2005/0114023 A1 * 5/2005 Williamson et al. ........ 701/214
2006/0074558 A1 * 4/2006 Williamson et al. ........ 701/213

* cited by examiner

*Primary Examiner*—Y. Beaulieu
(74) *Attorney, Agent, or Firm*—Duane Morris, LLP

(57) ABSTRACT

A computerized method generates unbiased estimates of parameters such as position, velocity, and acceleration of a vehicle. The method assigns initial vehicle states. Unbiased vehicle state estimates are obtained using a model incorporating a unique parameterization of the vehicle motion and state dynamics, and sensor registration bias states. Sensor measurements of the vehicle are used to iteratively update the vehicle states and covariances. Previous vehicle state and covariance, are propagated to produce current state and covariance estimates. If needed, a new vehicle model is adopted. Sensor registration biases are estimated to generate corrected measurement information. A measurement matrix and a measurement residual is determined. The Kalman gain matrix is determined, and used with measurement residual for state update. A new current state is generated. State covariance update is determined the same way, and used to generate a new current state covariance. These steps are repeated, producing unbiased vehicle parameter estimates.

10 Claims, 1 Drawing Sheet

COMPUTERIZED METHOD FOR GENERATING LOW-BIAS ESTIMATES OF POSITION OF A VEHICLE FROM SENSOR DATA

FIELD OF THE INVENTION

This invention relates to computerized methods for processing information received from one or more sensors observing a vehicle, so as to generate low-bias or unbiased estimates of the vehicle position, and of other parameters, if desired, which can be used for tracking, guidance and/or countermeasures.

BACKGROUND OF THE INVENTION

In the tracking of missiles and rockets for purposes such as guidance or intercept, it is common to use computer models of the vehicle to be guided or intercepted. These models receive sensor inputs from a variety of sensors, which give information relating to the current position and possibly other parameters. These measurements are subject to noise and bias. In this context, noise relates to stochastic random measurement processes at each measurement time, whereas bias relates to a stochastic random measurement process which is constant or common over the measurement period or succession of measurements. The noise and bias tend to obscure the sensed parameters, and the bias can introduce errors in the vehicle state estimates in those cases in which different sensors, each having its own bias, are used at different times during the vehicle's travel.

Prior art models which estimate the parameters of missiles or rockets in the boost phase assume non-linear models that incorporate certain dynamic or dynamical properties of the vehicle being tracked during state estimation or assume high order linear models to account for the nonlinear rocket motor acceleration. Specific acceleration and specific impulse are examples of dynamical properties used in non-linear models. Jerk (derivative of acceleration) and snap (derivative of jerk) are examples of the higher order states used in linear models. If the model is not consistent with the vehicle being tracked, the state estimates will be biased because of the assumptions made in the dynamic model. Put another way, the non-linear model that is used to determine the vehicle parameters assumes parameters of the vehicle, while the high order linear models may fail to sufficiently capture the nonlinear behavior of the vehicle accelerations, and the non-linear model may therefore be inherently biased by those assumptions. Thus, the current state-of-the-art in boost phase tracking models provides sub-optimal, degraded performance due to the fusing of multiple sensor measurements contaminated with sensor registration biases and also due to inadequacy of the dynamical modeling.

Improved models are desired for estimating parameters of a rocket or missile (a vehicle) in the boost phase with reduced bias.

SUMMARY OF THE INVENTION

The prior art attempts to remove the bias from the sensor measurements during sensor measurement processing, whereas the invention removes bias during the vehicle state estimation, thereby allowing enhanced fusion of available sensor measurements or information.

A computerized method according to an aspect of the invention is for generating low-bias or nominally unbiased estimates of at least one of position, velocity, acceleration, and specific mass flow rate of a vehicle, while also providing a means to perform sensor fusion and sensor registration bias estimation and mitigation. The method is called "Unified Unbiased Rocket Equation Extended Kalman Algorithm" (UUREEKA). The method is most useful when applied in the boost phase of a vehicle's travel. The method comprises the steps of setting parameters of the states of the vehicle based on previously determined measurement information (information resulting from measurements made by one or more sensors) relating to a vehicle model, and acquiring from at least one sensor a stream of time-tagged input measurement information relating to the current state of the vehicle. The stream of measurement information should be source identified if produced by plural sensors. The previous state of the vehicle is propagated to the time of the current time tag of the measurement information to produce a current state estimate. Covariance of the vehicle state estimate is propagated to the time of the current time tag of the measurement information to produce a current covariance estimate. A determination is made, using parameter reference sets (which may include information relating to a staging time estimate), as to whether a staging event has occurred, and if a staging event has occurred, adopting a new vehicle model. Sensor registration bias states are estimated for each of the reporting sensors, to generate estimated sensor bias state information. Sensor measurement information for each of the reporting sensors is corrected in response to the estimated sensor bias state information, to thereby generate corrected sensor measurement information. A sensor-dependent information or measurement matrix is generated, which relates the time-tagged input measurement information to the state error. A determination is made of the "measurement" residual which relates the current state estimate to the error in the current state estimate. The extended Kalman gain matrix is determined. The extended Kalman gain matrix is dependent upon the current vehicle model and the noise covariance of the time-tagged input measurement information. The state update is determined based upon the Kalman matrix and the "measurement" residual, and a new current state is generated by applying the state update. The state covariance update is determined based upon the Kalman matrix and the "measurement" residual, and a new current state covariance is generated by applying the state covariance update. The steps of acquiring from at least one sensor, propagating a previous state of said vehicle, propagating a covariance of the vehicle state, propagating a covariance of the vehicle state estimate, determining if a staging event has occurred, estimating sensor registration bias states, correcting sensor information for each of the reporting sensors, generating a sensor-dependent measurement matrix, determining the "measurement" residual, determining the extended Kalman gain matrix, determining the state update based upon the Kalman matrix, and determining the state covariance update are repeated, thereby producing said at least one of nominally unbiased vehicle position, velocity, acceleration, and specific mass flow rate for use in conjunction with said vehicle model to estimate parameters of said vehicle.

DESCRIPTION OF THE INVENTION

Figure 1:
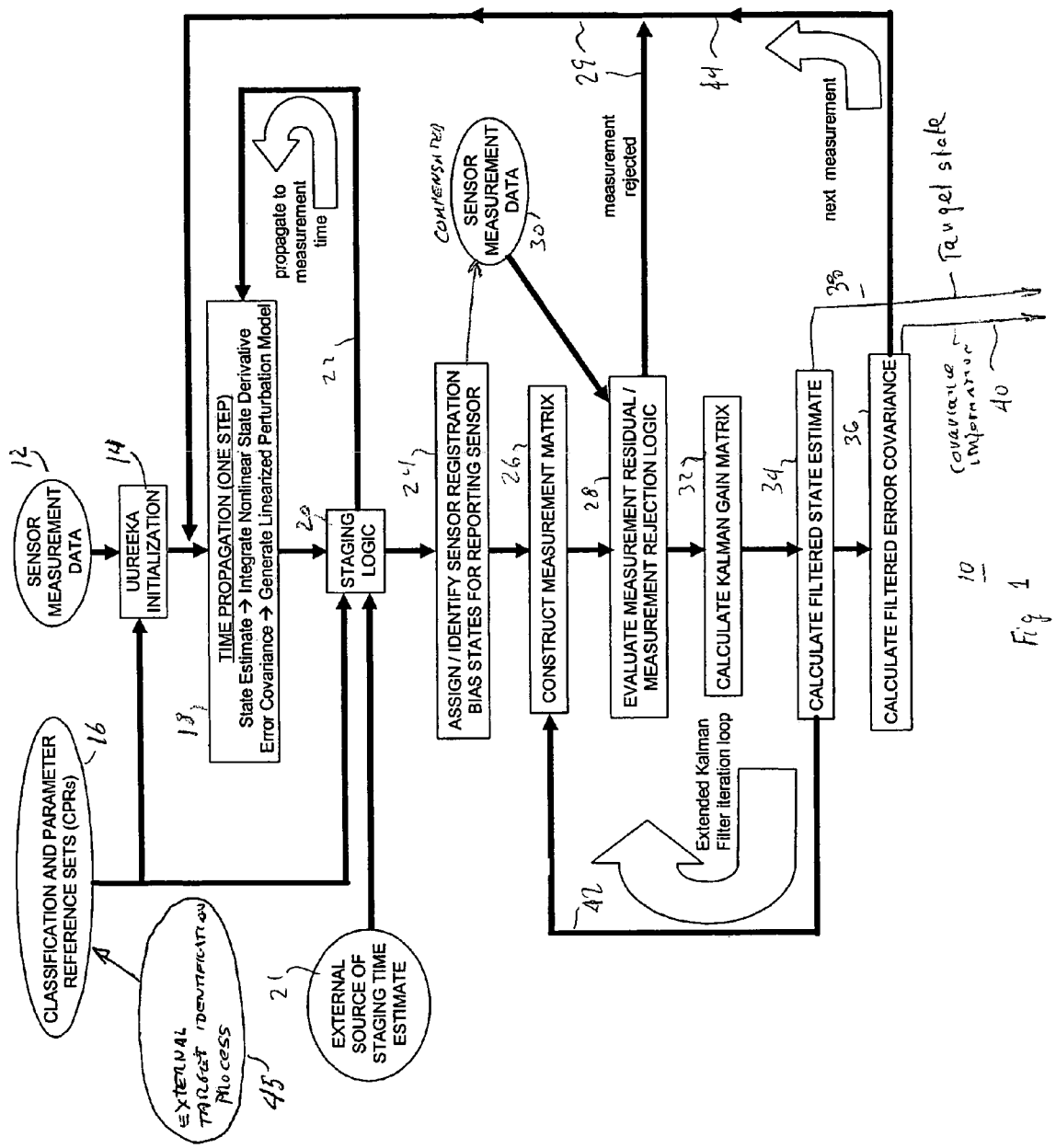
FIG. 1 is a simplified functional block diagram of the UUREEKA processing according to an aspect of the invention.

The current technology in boosting missile filtering relies on knowing the missile dynamic or dynamical properties such as mass flow rate and/or specific impulse to develop a truly unbiased track state. Ideally, this approach can work very well when requirements on threat parameter variations are restricted to a limited band about the threat's nominal operating region. However, when faced with realistic parameter variations or unknown threats, this approach can lead to biases in the missile state estimates, and these biases have ramifications in missile state propagation and missile identification algorithms that constitute the larger, overall countermeasures or fire control process. Additionally, current technology does not provide integrated means for sensor bias registration and data fusion for the multiple sensors that typically constitute a missile tracking network. Ordinarily, the filtered track states from each sensor are fused based on tracking error estimates. Thus, there is not currently a unified approach to this process, and the requirement for track fusion adds an additional algorithm, with additional processing time, to the missile tracking process. As mentioned, the prior art attempts or processes for removing the bias from the sensor measurements are performed during sensor measurement processing. The invention, by contrast, removes bias or corrects sensor bias registration during the vehicle state estimation in a model of the vehicle, thereby allowing enhanced fusion of available sensor measurements or information.

A boosting missile tracking algorithm according to an aspect of the invention addresses shortcomings of the prior art. This algorithm is called the Unified Unbiased Rocket Equation Extended Kalman Algorithm (UUREEKA). UUREEKA is "unified" in that it concurrently performs sensor bias registration, sensor measurement fusion and missile state estimation. It is nominally unbiased in that the initial state assumptions are eventually overridden by repeated iterations which correct the initial assumptions toward the values actually suggested by the measurement data. Measurement information or data from an arbitrary number of sensors, such as terrestrial radars and Overhead Non-Imaging Infrared (ONIR) satellites, can be processed by UUREEKA. In addition to missile-related states, the algorithm can incorporate angular registration bias states for each reporting sensor; such incorporation is preferred for each reporting sensor that contains registration bias error(s). These states permit all measurement data to be fused in a manner that is transparent to the missile state estimation process. These states also provide a buffering effect, and thus mitigate the impact of angular misalignments that would otherwise cause "conflict" between the various reporting sensors. Conflict in this sense can be explained as follows: assume a filter model has been operating using one source of sensor measurement data for a period of time, during which time an acceleration and/or velocity estimate has been obtained; if a new sensor measurement is then introduced into the process, and that new sensor measurement contains a positional or angular registration bias, the position residual between the model state estimate and the positional measurement from the newly reporting sensor will have an error that will tend to manifest as either an acceleration or velocity maneuver in the vehicle dynamics and thus degrade the overall estimation process, unless properly accounted for.

The model according to the invention is most useful in the boost phase of a vehicle's travel because the vehicle model during the boost phase is dependent upon the acceleration due to the thrust, which requires knowledge of the vehicle thrust and the mass, and therefore knowledge of the model. The invention overcomes the limitation of having to assume a thrust and mass by initially assuming a model, but then modifying the model by repeated iterations, without limitation on the thrust and mass parameters of the modeled vehicle. The method according to the invention is therefore most useful during the boost phase in which acceleration due to thrust is present, but can also be applied during the ballistic phase.

UUREEKA is referred to as "unbiased" because it generates nominally unbiased estimates of missile kinematic and physical parameter states. This results directly from the missile state variables and associated state dynamics equations which are selected for use. Indirect assumptions are made in the derivation of the state dynamics equations that certain missile physical parameters, such as mass flow rate and specific impulse, are constant. However, there is no direct use of these assumptions as is done, for example, in the equation for the acceleration $\ddot{x}$ of a missile due to thrust:

$$\ddot{x} = \frac{-I_{sp}g_c\dot{m}}{m} \quad (1)$$

where $I_{sp}$=specific impulse (assumed constant);

$g_c$=standard gravitational acceleration (constant);

$\dot{m}$=mass flow rate (assumed constant); and m=instantaneous mass.

As a result, UUREEKA is insensitive to variations in missile physical parameters, and is able to generate unbiased state estimates for boosting missiles that obey the fundamental rocket equation (1). Also, UUREEKA employs an extended Kalman filter algorithm in the estimation process that is well suited to the processing of the non-linear measurements from Overhead Non-Imaging Infrared (ONIR) spacecraft or satellites.

An aspect of the invention lies in the choice of the state variables, including the definition of the rocket equation states, that make this estimator tend to be an unbiased state estimator for tracking boosting rockets. Another aspect of the invention lies in the sensor registration bias states that enables consistent and unbiased measurement fusion for both ONIR and radar sensor systems.

In order to develop the UUREEKA filter equations, certain assumptions are made about the target dynamics. First, it is assumed that target acceleration obeys the standard rocket equation (1). Additionally, in order to derive the filter dynamics equations, it is initially assumed that both target mass flow rate m, and specific impulse, $I_{sp}$, are constant. However, these constant parameter assumptions are not subsequently used in an explicit sense. Secondly, due to the high altitudes at which target tracking occurs, it is assumed that rocket pressure correction (i.e. pressure thrust) and atmospheric drag are negligible.

Given these assumptions, the following equations describe the assumed UUREEKA target kinematics:

$$\ddot{Z}(t) = \frac{-\mu Z(t)}{|Z(t)|^3} + \underline{A}(t) - \omega \times (\omega \times Z(t)) - 2\omega \times Z(t) \quad (2)$$

[gravity] [thrust] [centrifugal] [coriolis]

$\underline{A}(t) = I_{sp}g_c\underline{b}(t)$ $A(t) = |\underline{A}(t)|$ $\underline{b}(t) = |\underline{b}(t)| \cdot \underline{b}(t)$ where $\ddot{Z}(t)$ is the target acceleration vector (Earth-fixed reference frame);

$\dot{Z}(t)$ is the target velocity vector (Earth-fixed reference frame);

$Z(t)$ is the target position vector (Earth-fixed reference frame);

μ is the Earth gravitational constant;

ω is the Earth angular velocity vector;

$I_{sp}$ is the specific impulse of the target rocket motor;

$g_c$ is the standard gravitational acceleration at Earth's equator; and $b(t)$ is the specific mass flow vector of target rocket motor.

and where the operator |v| denotes the magnitude of the vector (v) argument.

In the development of UUREEKA, it is assumed that two types of sensors are available in the target tracking network: Overhead Non-Imaging Infrared (ONIR) satellites and terrestrial radars. Each ONIR satellite in the tracking network generates line-of-sight measurements from the satellite to the detected target. These measurements are corrupted with angle noise and angular registration biases:

$$X_0 = Z - L_0 \quad [3]$$
$$X_0^m = T(\delta\theta_0)X_0 + |X_0|[u_0 v_0]\eta_0$$
$$\approx X_0 + \frac{\partial X_0^m}{\partial \theta_0}\delta\theta_0 + |X_0|U_0\eta_0$$
$$\hat{X}_0^m = \frac{X_0^m}{(X_0^m \cdot X_0^m)^{1/2}} \approx \hat{X}_0 + \frac{\partial \hat{X}_0^m}{\partial \theta_0}\delta\theta_0 + U_0\eta_0$$

where $L_0$=ONIR satellite position vector $Z$=target position vector $X_0$=relative position vector from ONIR satellite to target $X_0^m = X_0$ with registration bias and angle noise added $\hat{X}_0^m$=unit vector of $X_0^m$ (actual ONIR measurement)

T(.)=direction cosine matrix of Euler angle vector in the argument $\delta\theta_0$="small" angular registration bias vector for ONIR satellite $u_0, v_0$=unit vectors orthogonal to $X_0$ with arbitrary orientation $\eta_0$=(2×1) random vector of ONIR angle noise Each radar in the tracking network provides complete position vector measurements of the detected target with respect to the radar position. These measurements are corrupted with both angle and range noise, and angular registration biases:

$$X_R = Z - L_R \quad [4]$$
$$X_R^m = T(\delta\theta_R)X_R + |X_R|[u_R v_R]\eta_R^\alpha + \hat{X}_R\eta_R^r$$
$$\approx X_R + \frac{\partial X_R^m}{\partial \theta_R}\delta\theta_R + U_R\eta_R$$

where $L_R$=radar position vector $Z$=target position vector $X_R$=relative position vector from radar to target $X_R^m = X_R$ with angular registration bias and noise added (actual radar measurement)

$\delta\theta_R$="small" angular registration bias vector for radar $u_R, v_R$=unit vectors orthogonal to $X_R$ with arbitrary orientation $\eta_R^\alpha$=(2×1) random vector of radar angle noise $\eta_R^r$=random scalar of radar range noise and $$\eta_R = \begin{Bmatrix} \eta_R^\alpha \\ \eta_R^r \end{Bmatrix}, \quad U_R = \lfloor |X_R|u_R |X_R|v_R \hat{X}_R \rfloor$$

FIG. 1 is a simplified functional diagram of a system according to an aspect of the invention, for receiving sensor data and for generating covariance information and target state, such as position and velocity. In FIG. 1, the UUREEKA process 10 begins with an initial report from a sensor, represented as sensor measurement data 12. The sensor report includes approximate target state, more specifically target position and velocity. The target state is used for initialization, illustrated as a block 14, of the UUREEKA state vector. In addition, other Classification and Parameter Reference Sets (CPRS), illustrated as a block 16, are used to initialize other UUREEKA states, such as target acceleration, target specific mass flow rate, and possibly other states. Next, the current UUREEKA state vector, available from either the initialization states or, on subsequent iterations, from the previous state estimate produced by Calculate Filtered State Estimate block 34, is propagated in block 18 to the time associated with the current measurement. Initially, on the first iteration, the current UUREEKA state vector may be based on the initial sensor measurement, but on successive iterations, it will have a value that converges toward a final value.

The current state vector and the current covariance matrix are produced in block 18 from (a) the sensor measurements and (b) from the preceding state vector estimate and the preceding covariance matrix by generating a linearized perturbation state variable model, and using numerical integration of the associated state derivative or transition equations $$s(t+\Delta t) = s(t) + \int_t^{t+\Delta t} \dot{s}(s(t))dt \quad (5)$$

where:

$s$ is the state defined by $$s(t) = \begin{Bmatrix} Z(t) \\ \dot{Z}(t) \\ b(t) \\ A(t) \\ \delta\theta_{o1} \\ \vdots \\ \delta\theta_{on} \\ \delta\theta_{R1} \\ \vdots \\ \delta\theta_{Rm} \end{Bmatrix} \quad (6)$$

where the notation for the registration bias states denote: $\delta\theta_{oj}$ for the 2×1 bias state vector of the for jth ONIR sensor reporting (up to n); $\delta\dot{\underline{\theta}}_{Ri}$ for the 3×1 bias state vector of the for ith Radar sensor reporting (up to m).

As an example, a $4^{th}$ order Runge Kutta algorithm might be used.

Time propagation of the UUREEKA covariance matrix in block 18 of FIG. 1 involves a set of linearized state dynamics equations, developed as follows. A Taylor series expansion of the UUREEKA state derivative vector (equation 3) advanced in time by $\Delta t$ is given by $$\dot{s}(t + \Delta t) = \dot{s}(t) + \frac{\partial \dot{s}(t)}{\partial s(t)} \Delta s(t) + (\text{Higher Order Terms}) \quad (7)$$

If the UUREEKA state vector at time t, s(t) and its associated derivative are considered to be the "operating point" for linearization, the linearized state dynamics equations are $$\Delta \dot{s}(t) \approx A(\underline{s}(t))\Delta \underline{s}(t) + \underline{w}(t)$$

$$\Delta \underline{s}(t) = \Delta \underline{s}(t+\Delta t) - \Delta \underline{s}(t)$$

$$\Delta \dot{\underline{s}}(t) = \Delta \dot{\underline{s}}(t+\Delta t) - \Delta \dot{\underline{s}}(t) \quad (8)$$

where:

$$A(\underline{s}(t)) \equiv \left[\frac{\partial \dot{\underline{s}}(t)}{\partial \underline{s}(t)}\right]; \text{ and}$$

$\underline{w}(t)$ is state noise. Next, a state transition matrix for this linearized model can be approximated as $$\Phi(\underline{s}(t), \Delta t) \approx I + A(\underline{s}(t))\Delta t + 0.5 A(\underline{s}(t))^2 \Delta t^2 \quad (9)$$

Finally, time propagation of the UUREEKA error covariance matrix is performed with the following equation:

$$P(t+\Delta t) = \Phi(\underline{s}(t), \Delta t) P(t) \Phi(\underline{s}(t), \Delta t)^T + Q(\underline{s}(t), \Delta t) \quad (10)$$

with the UUREEKA error covariance matrix defined as:

$$P(t) = E\{(\underline{s}(t) - \hat{\underline{s}}(t))(\underline{s}(t) - \hat{\underline{s}}(t))^T\} \quad (11)$$

where E { } denotes the expectation operator used in stochastic analysis, and the state noise matrix defined as $$Q(\underline{s}(t), \Delta t) = \int_0^{\Delta t} \Phi(\underline{s}(t)) W \Phi(\underline{s}(t))^T dt \quad (12)$$

where $W = E(\underline{w}(t)\underline{w}(t)^T)$.

The UUREEKA dynamics equations (i.e. the nonlinear UUREEKA state derivative equations) are $$\dot{\underline{s}}(t) = \begin{Bmatrix} \dot{Z}(t) \\ \ddot{Z}(t) \\ \dot{\underline{b}}(t) \\ \dot{A}(t) \\ \delta\dot{\theta}_{o1} \\ \vdots \\ \delta\dot{\theta}_{on} \\ \delta\dot{\theta}_{R1} \\ \vdots \\ \delta\dot{\theta}_{Rm} \end{Bmatrix} = \begin{Bmatrix} \dot{Z}(t) \\ \frac{-\mu Z(t)}{|Z(t)|^3} + \frac{A(t)\underline{b}(t)}{|\underline{b}(t)|} - \omega \times (\omega \times Z(t)) - 2\omega \times \dot{Z}(t) \\ |\underline{b}(t)|\underline{b}(t) \\ A(t)|\underline{b}(t)| \\ 0 \\ \vdots \\ \vdots \\ \vdots \\ 0 \end{Bmatrix} \quad (13)$$

These equations are based on the assumed target kinematics introduced in equation (2). Additionally, it is assumed that all sensor registration biases are constant.

After the time propagation performed in block 18, the logic or scheme of FIG. 1 proceeds to staging logic 20, which accepts a staging time estimate from an external source 21 and reinitializes the acceleration parameter states and the covariance matrix elements corresponding to the acceleration parameter states, using the CPRS information selected based on an external target identification process 45. The overall time propagation occurs at the iteration rate, unless a sensor measurement enters or arrives between iteration updates, in which case the iteration cycle begins again with the new sensor input data. Put another way, the overall time propagation occurs in a series of small steps. At the completion of each small step, staging logic determines whether the UUREEKA processing should be transitioned to the next target stage, assuming that the boosting missile or target has multiple stages.

The state vector and covariance matrix information produced at each time increment by staging logic or block 20 of FIG. 1 is made available to block 18 by a path designated 22. In addition, when the current state vector and covariance matrix are propagated to the current measurement time (that is, the time at which a sensor measurement becomes available), block 18 propagates the current state vector and covariance matrix through block 20 and path 22 to a block 24. Block 24 represents a determination as to whether the currently reporting sensor has been previously assigned registration bias states in the UUREEKA state vector, and, if not, assignment of a registration bias state to the current reporting sensor. Thus, each time a new sensor reports, a new state is added to the state vector. The additional states represent the state registration biases associated with the sensor. These registration states are important in sensor bias registration and sensor information fusion. The sensor measurement data is compensated for the current estimate of the sensor bias in a block 30. As measurements from a given sensor are processed, the estimate of that sensor's biases is refined. Repeated processing provides a characterization of the bias errors associated with all the sensors within the tracking network. Further, incorporation of the registration bias estimates into the measurement residual processing, described below, enables the combination or fusion of measurements from multiple sensors without "conflict" due to the different biases of the individual sensors, that manifest as a different positional perception as to the location of the target.

Once the sensor bias states are assigned in block 24 of FIG. 1 and the sensor measurements are compensated in block 30, the system propagates the vehicle states, the covariances, and the compensated measurements to a block 26 for starting the extended Kalman filtering process. The extended Kalman filtering process generally involves five steps, namely (1) construction of the linearized measurement matrix, (2) evaluation of the measurement residual, (3) calculation of the Kalman gain matrix, (4) calculation of the filtered UUREEKA state vector, and (5) calculation of the filtered UUREEKA error covariance.

Block 26 represents construction of the measurement matrix H(t). The measurement matrix H(t) is a linearized version of a nonlinear measurement equation.

$$H(t) = \begin{cases} U_{oi}^T \left[ \frac{(I - \hat{X}_{oi}\hat{X}_{oi}^T)}{(X_o \cdot X_o)^{1/2}} \quad 0_{3\times3} \quad 0_{3\times3} \quad 0 \quad 0_{3\times3} \quad \ldots \quad \frac{\partial \hat{X}_{oi}}{\partial \theta_{oi}} \quad 0_{3\times3} \quad \ldots \right] & \text{for } i^{th}\text{ONIR} \\ [I_{3\times3} \quad\quad 0_{3\times3} \quad 0_{3\times3} \quad 0 \quad 0_{3\times3} \quad \ldots \quad \frac{\partial \hat{X}_{Rj}}{\partial \theta_{Rj}} \quad 0_{3\times3} \quad \ldots] & \text{for } j^{th}\text{Radar} \end{cases} \quad (14)$$

The characteristics of the measurement matrix, or its construction, are a function of the type of reporting sensor. A space-based passive infrared sensor providing line-of-sight data would produce a two-dimensional matrix, while a radar system might produce a three-dimensional matrix.

The measurement matrix, the state vectors and covariances are coupled from block 26 of FIG. 1 to a block 28. Block 28 also receives the compensated measurement data from block 30, and evaluates and forms the measurement residual according to $$\Delta m = \begin{cases} U_{oi}^T(\hat{X}_{oi}^m - \hat{X}_{oi}) & \text{for } i^{th}\text{ONIR measurement} \\ (X_{Rj}^m - X_{Rj}) & \text{for } j^{th}\text{Radar measurement} \end{cases} \quad (15)$$

The characteristics of the measurement residual are a function of the type of reporting sensor. A space-based passive infrared sensor providing line-of-sight data would produce a two-dimensional vector, while a radar system would produce a three-dimensional vector. For the case of ONIR measurements, the measurement residual process iterates until a convergence criterion is satisfied. This allows use of ONIR measurements, which are a nonlinear function of the target state, and the measurement matrix is linearized around or about the estimated state vector. The extended Kalman filter iteration continues until further correction of the UUREEKA state vector using the current measurement becomes small or inconsequential. Also in block 28 of FIG. 1, a test is performed of the quality of the measurement or based upon the current state vector residual and the covariance, as known in the art. If the measurement is of low quality, it is rejected, and the iteration returns along a path 29 back to block 18.

If the measurement is accepted in block 28 of FIG. 1, it is coupled or applied to a block 32. Block 32 represents the computation of the Kalman gain matrix according to $$K(t) = P(t)H(t)^T(H(t)P(t)H(t)^T + R(t))^{-1} \quad (16)$$

where R(t) is the measurement noise covariance matrix associated with the currently reporting sensor:

$$R(t) = \begin{cases} U_{oi}^T U_{oi} \sigma_{oi}^2 & \text{for } i^{th}\text{ONIR} \\ U_{Rj}^T \begin{bmatrix} \sigma_{Rj\alpha}^2 & 0 & 0 \\ 0 & \sigma_{Rj\alpha}^2 & 0 \\ 0 & 0 & \sigma_{Rjr}^2 \end{bmatrix} U_{Rj} & \text{for } j^{th}\text{radar} \end{cases} \quad (17)$$

which is well known in the art as to the $j^{th}$ radar aspect, although not as to the ONIR aspect. The $\alpha$ represents the measurement noise standard deviations for (1) ONIR: angular noise perpendicular to the line-of-sight, and for (2) RADAR: angular and range noise. The resulting Kalman gain matrix is coupled to a blocks 34 and 36 of FIG. 1, for calculation of the updated state vector and covariance, respectively, which are updated to conform to the new compensated measurements and noise characteristics of the measurements $$\underline{s}(t)_+ = \underline{s}(t) + K(t)\Delta m$$

$$P(t)_+ = (I - K(t)H(t))P(t)(I - K(t)H(t))^T + K(t)R(t)K(t)^T \quad (18)$$

where the subscript "+" denotes the state or covariance after applying the state and covariance, respectively, at time t.

The system produces the updated state vector and covariances at outputs 38 and 40, respectively.

The updated state vector produced by block 34 of FIG. 1 is coupled by way of a path 42 back to block 26 in the case of infrared measurements or more generally in the case of line-of-sight measurements to repeatedly iterate around blocks 26, 28, 32, and 34 until they converge to a final or steady-state value. As previously noted, the reason for this is that line-of-sight measurements are a nonlinear function of the state vector and therefore the measurement matrix must be linearized around the estimated state vector.

The calculated filtered state vector and covariance are returned to block 18 of FIG. 1 by way of a path illustrated as 44, to begin a new iteration.

A skilled practitioner in the art will realize that UUREEKA can be applied to the generic problem of target tracking by a multi-sensor network. For example, by extending the concept of angular registration bias states to positional registration, UUREEKA could be applied to the "gridlock problem", which is currently addressed by the United States Navy's Cooperative Engagement Capability (CEC).

Some embodiments of the invention may provide advantages such as unbiased boost-phase filtering with sensor bias registration and fusion. The same embodiment, or others, may facilitate estimation of burn-out time of the rocket motor of the vehicle based on the un-biased vehicle state estimates.

A computerized method according to an aspect of the invention is for generating nominally unbiased estimates of at least one of position, velocity, acceleration, and specific mass flow rate of a vehicle. The estimates are preferably performed in the boost phase of the vehicle. The computerized method is also usable to estimate the sensor registration bias. The method achieves unbiased estimates based on a unique parameterization of the model's state vector and corresponding state dynamics modeling. The computerized method comprises the steps of setting parameters of the states of the vehicle based on previously determined information relating to a vehicle model, and acquiring from at least one sensor a stream of time-tagged input information relating to the current state of the vehicle. The stream of input information should also be source identified if produced by plural sensors. A previous state of the vehicle is propagated to the time of the current time tag of the information to produce a current state estimate. A covariance of the vehicle state estimate is propagated to the time of the current time tag of the information to produce a current covariance estimate. A determination is made as to whether a staging event has occurred using parameter reference sets, which include information relating to a staging time estimate. If a staging event has occurred, a new vehicle model is adopted. Sensor registration bias states are estimated for each of the reporting sensors to generate sensor bias state information. Sensor information for each of the reporting sensors is corrected in response to the sensor bias state information, to thereby generate corrected sensor measurement information. A sensor-dependent measurement matrix is generated, which relates the time-tagged input information or measurements to the state error. A "measurement" residual is determined, which relates the current state estimate to the error in the current state estimate. The extended Kalman gain matrix is determined. This Kalman gain matrix is dependent upon the current vehicle model and the noise covariance of the time-tagged input information. The state update is determined based upon the Kalman matrix and the "measurement" residual, and a new current state is generated by applying the state update. The state covariance update is determined, based upon the Kalman matrix and the "measurement" residual, and a new current state covariance is generated by applying the state covariance update. The steps of acquiring from at least one sensor, propagating a previous state of the vehicle, propagating a covariance of the vehicle state, propagating a covariance of the vehicle state estimate, determining if a staging event has occurred, estimating sensor registration bias states, correcting sensor information for each of the reporting sensors, generating a sensor-dependent measurement matrix, determining the "measurement" residual, determining the extended Kalman gain matrix, determining the state update based upon the Kalman matrix, and determining the state covariance update are repeated, thereby producing the at least one of nominally unbiased vehicle position, velocity, acceleration, and specific mass flow rate for use in conjunction with the vehicle model to estimate parameters of the vehicle.

What is claimed is:

1. A computerized method for generating nominally unbiased estimates of at least one of position, velocity, acceleration, and specific mass flow rate of a vehicle, said computerized method comprising the steps of:

setting parameters of the states of said vehicle based on previously determined information relating to a vehicle model;

acquiring from at least one sensor a stream of time-tagged input information relating to the current state of said vehicle, said stream of information also being source identified if produced by plural sensors;

propagating a previous state of said vehicle to the time of the current time tag of said information to produce a current state estimate;

propagating a covariance of the vehicle state estimate to the time of the current time tag of said information to produce a current covariance estimate;

determining if a staging event has occurred using parameter reference sets, and if a staging event has occurred, adopting a new vehicle model;

estimating sensor registration bias states for each of the reporting sensors to generate sensor bias state information;

correcting sensor information for each of the reporting sensors in response to said sensor bias state information, to thereby generate corrected sensor measurement information;

generating a sensor-dependent measurement matrix which relates the time-tagged input information or measurements to a state error;

determining the "measurement" residual which relates the current state estimate to the error in the current state estimate;

determining the extended Kalman gain matrix, which is dependent upon the current vehicle model and the noise covariance of the time-tagged input information;

determining the state update based upon the Kalman matrix and the "measurement" residual, and generating a new current state by applying the state update;

determining the state covariance update based upon the Kalman matrix and the "measurement" residual, and generating a new current state covariance by applying the state covariance update;

repeating said steps of acquiring measurements or data from at least one sensor, propagating a previous state of said vehicle, propagating a covariance of the vehicle state estimate, determining if a staging event has occurred, estimating sensor registration bias states, correcting sensor information for each of the reporting sensors, generating a sensor-dependent measurement matrix, determining the "measurement" residual, determining the extended Kalman gain matrix, determining the state update based upon the Kalman matrix, and determining the state covariance update, thereby producing said at least one of nominally unbiased vehicle position, velocity, acceleration, and specific mass flow rate for use in conjunction with said vehicle model to estimate parameters of said vehicle.

2. A method according to claim 1, wherein said computerized method for generating nominally unbiased estimates of at least one of position, velocity, acceleration, and specific mass flow rate also generates nominally unbiased estimates of sensor registration bias of those sensors observing said vehicle.

3. A method according to claim 2, wherein said computerized method is used during the boost phase of the vehicle.

4. A method according to claim 1, wherein said step of determining if a staging event has occurred using parameter reference sets includes the step of using information relating to a staging time estimate.

5. A method according to claim 1, wherein said steps of propagating a previous state of said vehicle, propagating a covariance of the vehicle state estimate, and determining the extended Kalman gain matrix includes processing in accordance with nonlinear state derivative equations $$\dot{s}(t) = \begin{Bmatrix} \dot{Z}(t) \\ \ddot{Z}(t) \\ \underline{\dot{b}}(t) \\ \dot{A}(t) \\ \delta\dot{\underline{\theta}}_{o1} \\ \vdots \\ \delta\dot{\underline{\theta}}_{on} \\ \delta\dot{\underline{\theta}}_{R1} \\ \vdots \\ \delta\dot{\underline{\theta}}_{Rm} \end{Bmatrix} = \begin{Bmatrix} \dot{Z}(t) \\ \frac{-\mu Z(t)}{|Z(t)|^3} + \frac{A(t)\underline{b}(t)}{|\underline{b}(t)|} - \underline{\omega} \times (\underline{\omega} \times \underline{Z}(t)) - 2\underline{\omega} \times \dot{\underline{Z}}(t) \\ |\underline{\dot{b}}(t)|\underline{b}(t) \\ A(t)|\underline{b}(t)| \\ 0 \\ \vdots \\ \vdots \\ \vdots \\ \vdots \\ 0 \end{Bmatrix}. \qquad (13)$$

6. A method according to claim 1, wherein said step of generating a sensor-dependent measurement matrix comprises the step of constructing a linearized version of a nonlinear measurement equation $$H(t) = \begin{cases} U_{oi}^T \left[ \frac{(I - \hat{\underline{X}}_{oi}\hat{\underline{X}}_{oi}^T)}{(\underline{X}_o \cdot \underline{X}_o)^{1/2}} \quad 0_{3\times3} \quad 0_{3\times3} \quad 0 \quad 0_{3\times3} \quad \ldots \quad \frac{\partial \hat{\underline{X}}_{oi}}{\partial \theta_{oi}} \quad 0_{3\times3} \quad \ldots \right] & \text{for } i^{th}\text{ONIR} \\ \left[ I_{3\times3} \quad\quad\quad\quad\quad 0_{3\times3} \quad 0_{3\times3} \quad 0 \quad 0_{3\times3} \quad \ldots \quad \frac{\partial \hat{\underline{X}}_{Rj}}{\partial \theta_{Rj}} \quad 0_{3\times3} \quad \ldots \right] & \text{for } j^{th}\text{Radar} \end{cases} \qquad (14)$$

7. A method according to claim 1, wherein said step of propagating a covariance of the vehicle state estimate comprises the step of numerical integration of the state derivative or state dynamics equations $$s(t + \Delta t) = s(t) + \int_{t}^{t+\Delta t} \dot{s}(s(t))dt \qquad (5)$$

where:

$\underline{s}$ is the state defined by $$s(t) = \begin{Bmatrix} \underline{Z}(t) \\ \underline{\dot{Z}}(t) \\ \underline{b}(t) \\ A(t) \\ \delta\underline{\theta}_{o1} \\ \vdots \\ \delta\underline{\theta}_{on} \\ \delta\underline{\theta}_{R1} \\ \vdots \\ \delta\underline{\theta}_{Rm} \end{Bmatrix}. \qquad (6)$$

8. A method according to claim 7, wherein said step of integration of the state derivative or state dynamics equations comprises the step of numerical integration.

9. A method according to claim 1, wherein said step of determining the "measurement" residual comprises the step of determining the measurement residual according to $$\Delta m = \begin{cases} U_{oi}^T(\hat{\underline{X}}_{oi}^m - \hat{\underline{X}}_{oi}) & \text{for } i^{th}\text{ONIR measurement} \\ (\underline{X}_{Rj}^m - \underline{X}_{Rj}) & \text{for } j^{th}\text{Radar measurement} \end{cases}. \qquad (15)$$

10. A method according to claim 1, wherein said step of determining the extended Kalman gain matrix comprises the step of computation of the Kalman gain matrix according to $$K(t) = P(t)H(t)^T(H(t)P(t)H(t)^T + R(t))^{-1} \qquad (16)$$

where R(t) is the measurement noise covariance matrix associated with the currently reporting sensor:

$$R(t) = \begin{cases} U_{oi}^T U_{oi} \sigma_{oi}^2 & \text{for } i^{th}\text{ ONIR} \\ U_{Rj}^T \begin{bmatrix} \sigma_{Rj\alpha}^2 & 0 & 0 \\ 0 & \sigma_{Rj\alpha}^2 & 0 \\ 0 & 0 & \sigma_{Rjr}^2 \end{bmatrix} U_{Rj} & \text{for } j^{th}\text{ radar} \end{cases}. \qquad (17)$$

* * * * *